(12) United States Patent
Tanaka (10) Patent No.: US 6,956,800 B2
(45) Date of Patent: Oct. 18, 2005

(54) PRE-PIT DETECTING APPARATUS DETECTING PRE-PIT SIGNAL FROM ONLY SIGNALS INPUT DURING PERIOD OF APPLYING LIGHT BEAM HAVING REPRODUCING POWER

(75) Inventor: Junji Tanaka, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 439 days.

(21) Appl. No.: 10/045,038

(22) Filed: Jan. 15, 2002

(65) Prior Publication Data

US 2002/0097991 A1 Jul. 25, 2002

(30) Foreign Application Priority Data

Jan. 15, 2001 (JP) ............................ P2001-006567

(51) Int. Cl.⁷ .......................... G11B 19/12; G11B 7/007
(52) U.S. Cl. ................................. 369/53.2; 369/44.34
(58) Field of Search ............................. 369/53.2, 44.34

(56) References Cited

U.S. PATENT DOCUMENTS 5,930,222 A * 7/1999 Yoshida et al. ............. 369/116
6,160,773 A 12/2000 Maegawa et al.
6,181,657 B1 * 1/2001 Kuroda et al. ............. 369/59.1
6,246,660 B1 * 6/2001 Yanagawa ................... 369/116
6,522,608 B1 * 2/2003 Kuroda ..................... 369/47.28

FOREIGN PATENT DOCUMENTS

| EP | 0 751 506 A2 | 1/1997 |
| EP | 0 871 169 A1 | 10/1998 |

* cited by examiner

Primary Examiner—Gautam R. Patel
(74) Attorney, Agent, or Firm—Young & Thompson (57) ABSTRACT

When record information is recorded on a recording medium with recording control information pre-recorded thereon by forming pre-pits so that the recording control information will be used to control the recording of the record information to be recorded on the recording medium, a first light beam having first power and a second light beam having second power different from the first power are irradiated to the pre-pits on a time-shared basis according to the record information to generate read signals generated from electrical signals according to the amounts of reflected light of the respective beams so that the pre-pits will be detected from inputs of the read signals. In this configuration, the pre-pits are detected from only the read signals input during a period of irradiation of the second light beam.

4 Claims, 7 Drawing Sheets

PRE-PIT DETECTING APPARATUS DETECTING PRE-PIT SIGNAL FROM ONLY SIGNALS INPUT DURING PERIOD OF APPLYING LIGHT BEAM HAVING REPRODUCING POWER

BACKGROUND OF THE INVENTION

1. Field of the Invention

The present invention relates to the technical field of pre-pit detection equipment for detecting pre-pits as pre-information formed on a high-density recording medium such as a DVD-R (DVD-Recordable) or DVD-RW (DVD-Rerecordable).

2. Description of the Related Art

In general, address information and reference signals for generating clock signals for use in recording and reproducing operations are pre-recorded on a recordable type optical recording medium in the form of pre-pits and pre-grooves. For example, on a DVD-R (Digital Versatile Disc-Recordable), pre-grooves as regions for recording information such as video and audio data intended to be recorded as recording pits are formed, while pre-pits (hereinafter called land pre-pits or LPP) are recorded on land portions each of which is formed between the pre-grooves.

In the operation of a pre-pit detecting device, reflected light of a light beam irradiated to a pre-groove is received in four divided regions A, B, C and D in a quadripartite photo-detector to obtain electrical signals from the divided regions A through D according to the amounts of reflected light, respectively. As a result, first and second read signals are generated on the basis of the outputs of electrical signals, and the difference therebetween is computed to generate a difference signal (hereinafter called a "radial push-pull signal"). Then the radial push-pull signal is compared with a threshold by means of an LPP-signal binarizing circuit to obtain a signal extracted as a binary signal (LPP signal). Based on the extracted LPP signal, address information and reference signals for generating clock signals for use in recording and reproducing operations are generated. Further, to improve LPP signal extraction performance, an AGC (Auto Gain Control) circuit performs AGC for the first and second read signals to make the amplitudes of both signals coincide before generation of the above-mentioned radial push-pull signal.

Upon recording record information on the DVD-R, two light beams different in intensity from each other are irradiated to the DVD-R. The light beam having high intensity (hereinafter called "recording power") is used to form recording pits corresponding to record information on the pre-grooves so as to record the record information. On the other hand, the light beam having low intensity (hereinafter called "reproducing power") is to read recorded information from the information tracks without forming recording pits when it is irradiated to the information tracks.

Upon recording the record information on the DVD-R, the LPPs are extracted both the period during which the light beam is irradiated onto the DVD-R with the recording power (hereinafter called the "mark period") and the period during which the light beam is irradiated onto the DVD-R with the reproducing power (hereinafter called the "space period").

To extract the LPPs properly during the mark period and the space period upon recording the record information on the DVD-R, there is provided a pre-pit detecting device, for example, as disclosed in Japanese Patent Laid-Open No. Hei 10-283638. In the pre-pit detecting device, an LPP-signal binarizing circuit corresponding to the beam intensity during the mark period and an LPP-signal binarizing circuit corresponding to the beam intensity during the space period are provided in parallel, so that LPP signals are extracted respectively using thresholds corresponding to respective powers of light beams. Then the logical sum of the outputs of both LPP signals is output as the final LPP signal.

The read signals input by irradiating the recording power during the mark period, however, contain lots of noise such as an electrical overshoot. Further, since the LPPs extracted during the mark and space periods vary in amplitude, proper AGC may not be performed, which causes the existence of LPP signals that will never exist in the extracted LPP signals (detection error).

SUMMARY OF THE INVENTION

The present invention has been made in view of the above-mentioned problem, and it is an object thereof to provide a pre-pit detecting apparatus capable of detecting correct LPP signals independently of noise due to recording power.

The above object of the present invention can be achieved by a pre-pit detecting apparatus (52) of the present invention, in which recording control information, for use of recording control upon recording record information on a recording medium (50), is recorded in advance by forming pre-pits (104). The apparatus is provided with: a light beam applying device (51) for applying a first light beam having first power and a second light beam having second power different from the first power to the pre-pits on a time-shared basis according to the record information when recording the recording information on the recording medium; a read signal generating device (1) for generating read signals from electrical signals according to the amounts of reflected light of the respective beams; and a pre-pit signal detecting device (6, 7) for inputting the generated read signal and detecting a pre-pit signal from the input read signal. Further, said pre-pit signal detecting device (6, 7) detects a pre-pit signal from only the read signals input during the period of applying of the second light beam.

According to the invention, the pre-pits are detected from only the read signals input during the period of the irradiation of the second light beam. Therefore, even if noise such as an electrical overshoot is contained in the read signals input by irradiating the first light beam, since any pre-pit contained in the read signals is off the subject for detection, correct recording clock pre-pits from which the noise is removed can be detected from only the read signals input during the period of the irradiation of the second light beam.

In one aspect of the present invention, the first power is higher than the second power.

The above object of the present invention can be achieved by a pre-pit detecting apparatus (52) of the present invention, in which recording control information, for use of recording control upon recording record information on a recording medium (50), is recorded in advance by forming pre-pits (104). The apparatus is provided with: a light beam applying device (51) for applying a first light beam having first power and a second light beam having second power different from the first power to the pre-pits on a time-shared basis according to the record information when recording the recording information on the recording medium; a read signal generating device (1) for generating read signals from electrical signals according to the amounts of reflected light of the respective beams; and a sample hold circuit (1) for inputting the generated read signal and holding the input read signal at a predetermined timing. Further, said sample hold circuit outputs (1), during the period of applying of the second light beam, the read signals input during the period while holding the same, and outputs, during the period of applying of the first light beam, the read signals held during the applying of the second light beam.

According to the present invention, the read signals input during the period of the irradiation of the second light beam are output and held during the period, and the read signals held during the period of the irradiation of the second light beam are output during the period of the irradiation of the first light beam. Therefore, even if noise such as an electrical overshoot is contained in the read signals input by irradiating the first power, since any pre-pit contained in the read signals is off the subject for detection, correct recording clock pre-pits from which the noise is removed can be detected from only the read signals input during the period of the irradiation of the second light beam.

In one aspect of the present invention, the first power is higher than the second power.

DESCRIPTION OF THE PREFERRED EMBODIMENTS

The following section will describe preferred embodiments of the present invention with reference to the accompanying drawings. It should be noted that the embodiments to be described below assume a pre-pit detecting device for detecting pre-pits from a DVD-R as a recording medium on which address information indicative of an information recording position on the recording medium and reference signals for generating clock signals for use in recording and reproducing operations are formed as LPPs.

Figure 1:
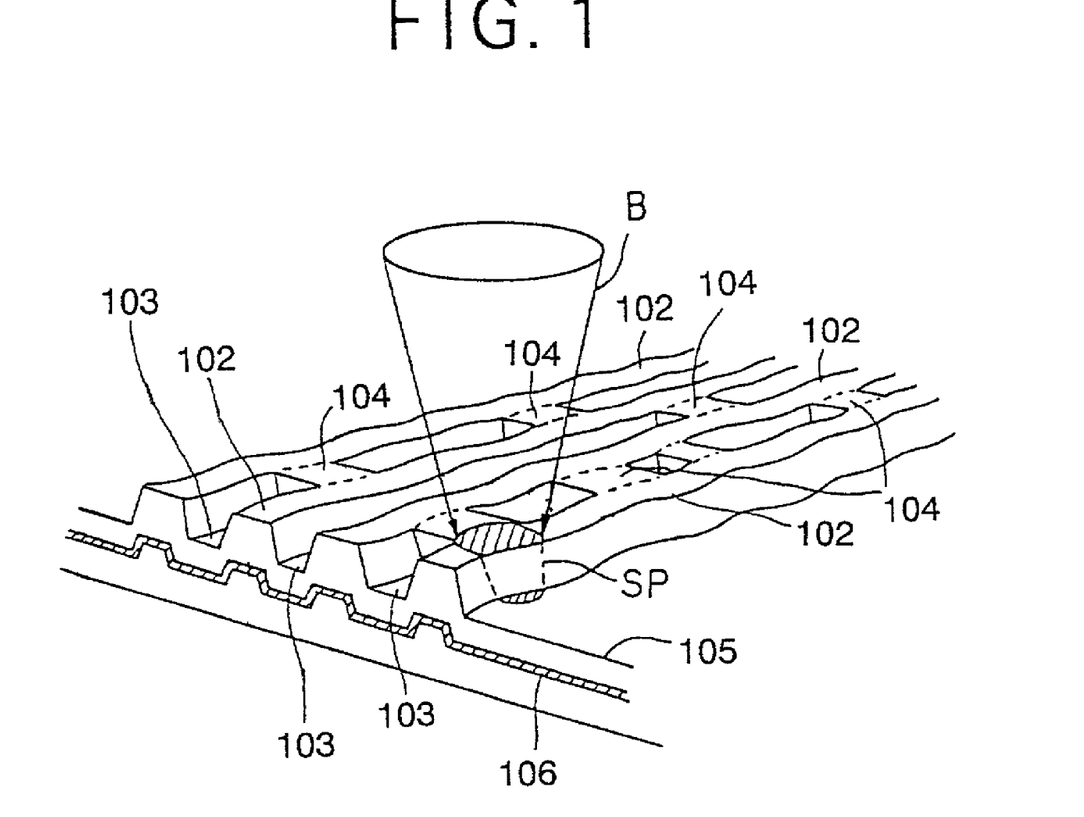
FIG. 1 is a cross-sectional perspective view of a DVD-R 50 according to an embodiment of the present invention.

Referring first to FIG. 1, description will be made about the physical structure of the DVD-R according to an embodiment of the present invention. FIG. 1 is a cross-sectional perspective view of the DVD-R 50 according to the embodiment of the present invention. As shown in FIG. 1, the DVD-R 50 is a pigment type DVD-R which is provided with a pigment film 105 capable of writing information once. Pre-grooves 102 as information tracks on which record information is to be recorded, and lands 103 as guide tracks for guiding a light beam B like a laser beam as reproducing and recording light to the pre-grooves 102 are formed on the DVD-R 50. The DVD-R 50 is also provided with a protective film for protecting the pre-grooves and the lands, and a reflection surface 106 for reflecting the optical beam B at the time of reproduction of record information. Then LPPs 104 are formed on the lands 103.

In the DVD-R 50, the pre-grooves 102 are wobbled at a frequency used as a standard of reference to the rotation speed of the DVD-R 50. Upon recording on the DVD-R 50 record information (information such as image information intended to be recorded other than pre-information and sync signals), the wobbling frequency of the pre-grooves 102 is detected at an information recording apparatus to obtain a sync signal so that the DVD-R 50 will be controlled to rotate at a predetermined speed. At this time, the LPPs 104 are also detected to obtain pre-information beforehand so as to obtain address information and the like indicative of information recording positions on the DVD-R 50. Thus the record information is recorded at a corresponding recording position based on the address information.

In recording the record information, the light beam B is so irradiated that the center of the light beam B will coincide with the center of a corresponding pre-groove 102. As a result, a recording information pit corresponding to the record information is formed on the pre-groove 102 to form the record information. At this time, the size of the light spot SP is so set that the light spot is irradiated not only to the pre-groove 102 but partially to the adjacent land 103 as well. Using reflected light of the light spot partially irradiated to the land 103, pre-information is detected from the LPP 104 by a push-pull method to obtain the pre-information. On the other hand, using reflected light of the light spot irradiated to the pre-groove 102, a wobble signal is detected from the pre-groove 102 to obtain a clock signal for rotation control.

Figure 2:
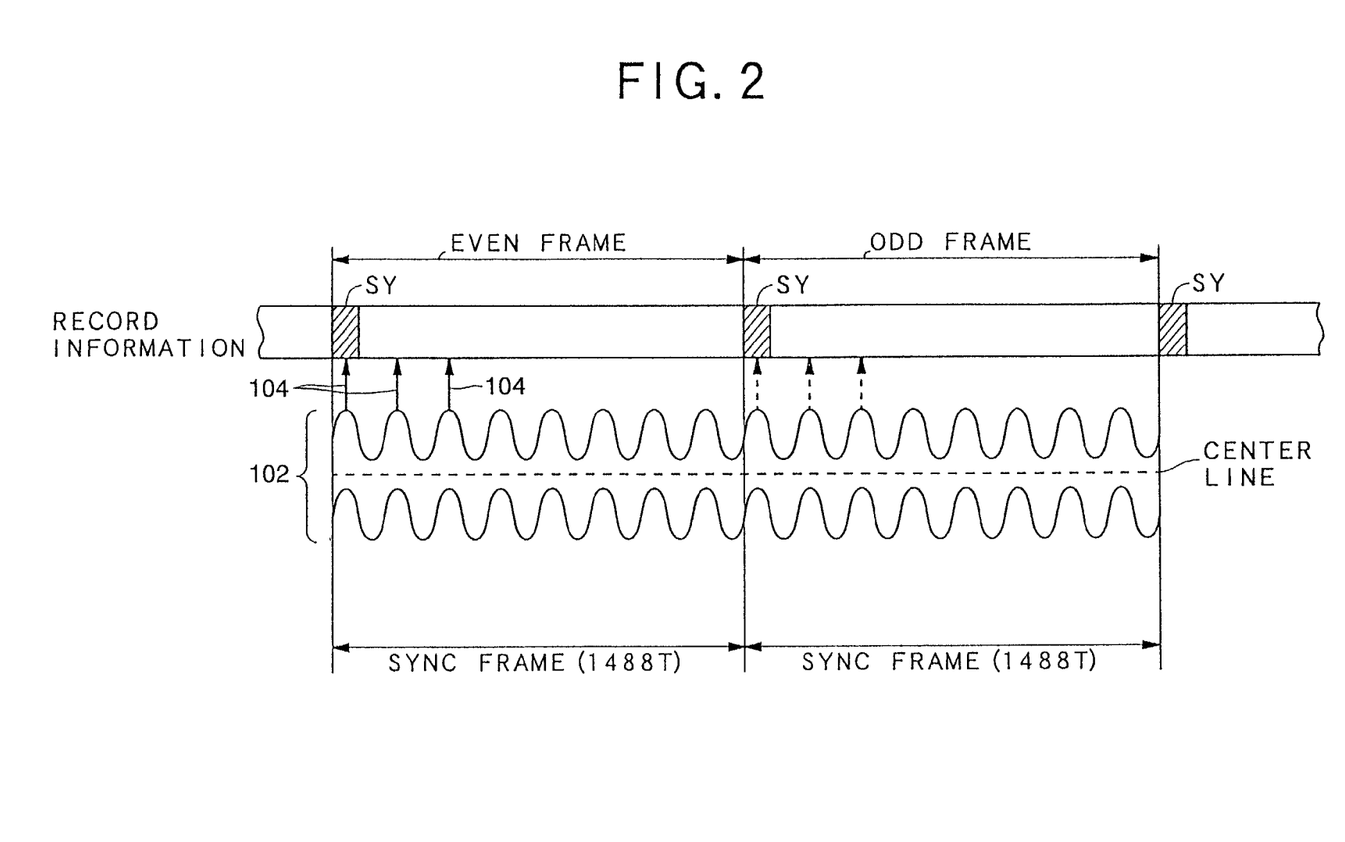
FIG. 2 is a schematic diagram showing a record format of pre-information and rotation control information pre-recorded on the DVD-R 50.

Referring next to FIG. 2, description will be made about a record format of the pre-information and rotation control information pre-recorded on the DVD-R 50. It should be noted that the term "pre-recorded" means "preformed" as a disk. FIG. 2 is a schematic diagram showing a record format of the pre-information and rotation control information pre-recorded on the DVD-R 50. In FIG. 2, the upper portion shows a record format of the record information, and corrugated waveforms of the lower portion show a wobbling state (a plan view) of the pre-grooves 102 for recording the record information. Further, upward arrows between the record information and the wobbling state of the pre-grooves 102 schematically show positions at which LPPs 104 are formed. It should be noted that in FIG. 2 the wobbling state of the pre-grooves 102 is shown with amplitude greater than actual amplitude for the sake of clarity. Further, the record information is recorded on the centerline of each corresponding pre-groove 102.

As shown in FIG. 2, the record information to be recorded on the DVD-R 50 is divided beforehand on a sync-frame basis. 26 sync frames form one recording sector as an information unit, and 16 recording sectors form one ECC block as an information block. It should be noted that one sync frame has a length 1488 times (1488T) longer than the unit length (hereinafter called T) corresponding to a bit interval defined by the record format for recording the above-mentioned record information. Further, sync information SY for synchronization on a sync-frame basis is recorded in the top 14 T portion of each sync frame.

On the other hand, the pre-information to be recorded on the DVD-R 50 is recorded on a sync-frame basis. In recording the pre-information using the LPPs 104, one LPP 104, as indicating a sync signal in the pre-information, is always formed on the land 103 adjacent to a region in which the sync information SY is recorded for each sync frame of the record information. Meanwhile, one or two LPPs 104 indicative of the contents of the pre-information to be recorded are formed on the land 103 adjacent to the first half of the sync frame containing information other than the sync information SY (or no LPP 104 may be formed with respect to the first half of the sync frame containing information other than the sync information SY, depending on the contents of the pre-information to be recorded). At this time, the LPPs 104 are formed in either even-numbered frames (hereinafter called the "EVEN frames") or odd-numbered frames (hereinafter called the "ODD frames") of each recording sector to record the pre-information. In other words, if the LPPs 104 are formed in the EVEN frames in FIG. 2 (as indicated with the solid upward arrows), no LPPs 104 will be formed in the ODD frames adjacent to the EVEN frames.

The relationship between the wobbling state of the pre-grooves 102 and the LPPs 104 is accounted for by the fact that the LPPs 104 are formed in positions where the amplitude of wobbling becomes the maximum.

On the other hand, the pre-grooves 102 are wobbled all over the sync frames on a constant wobbling frequency, f0 of 140 kHz (at which one sync frame corresponds to a part for eight waves of the fluctuating waveform of the pre-grooves 102). Then the constant wobbling frequency, f0 is detected by a pre-pit detecting device or the like to extract a sync signal for use in controlling the revolution of a spindle motor, not shown, for rotating the DVD-R 50.

Referring next to FIGS. 3 through 7, description will be made about a pre-pit detecting device for detecting pre-pits from the above-mentioned DVD-R 50 according to the present invention.

Figure 3:
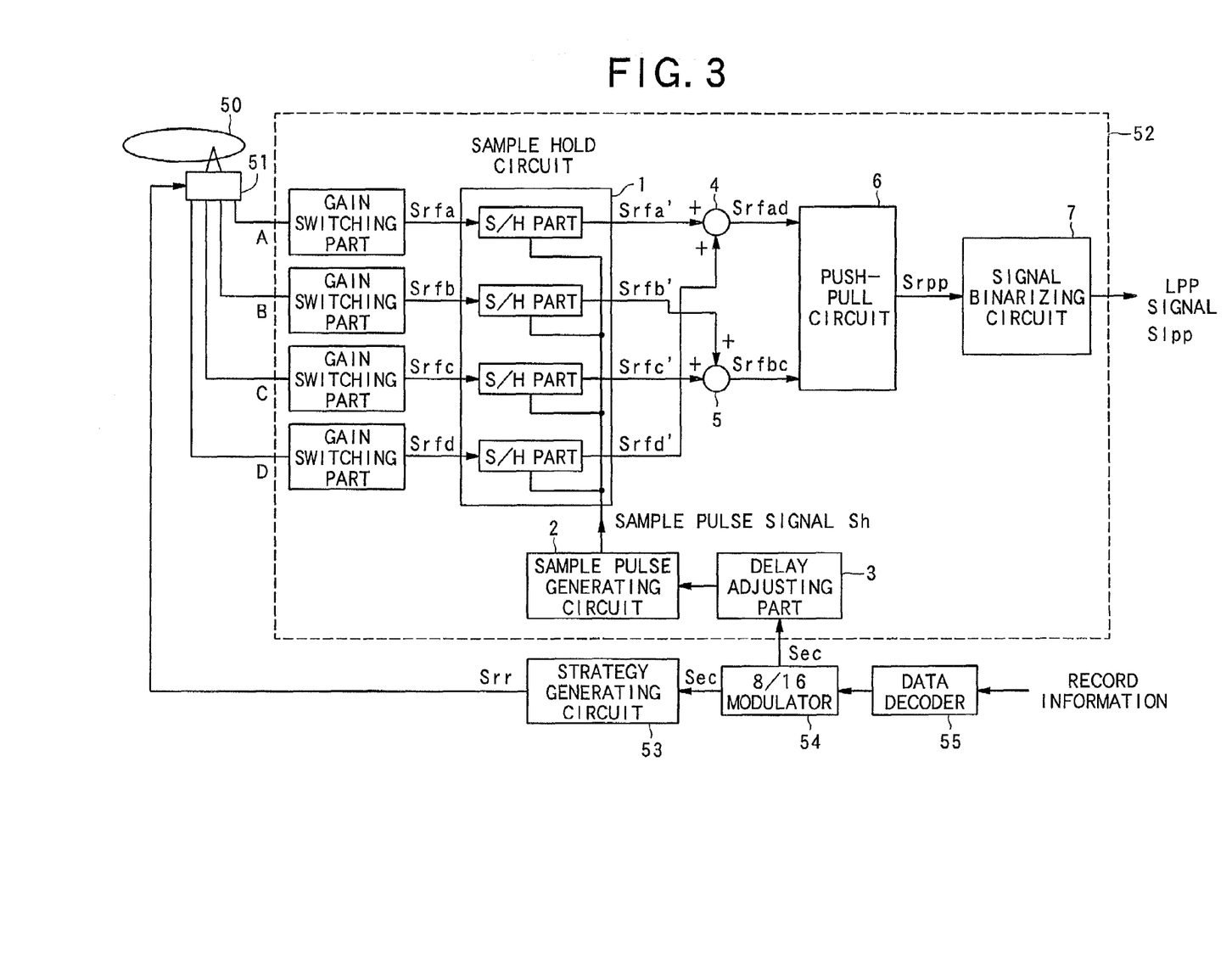
FIG. 3 is a block diagram showing the general structure of components related to a pre-pit detecting device for use in a recording/reproducing apparatus for the DVD-R 50 according to the embodiment.

FIG. 3 is a block diagram showing the general structure of components related to a pre-pit detecting device for use in a recording/reproducing apparatus for the DVD-R 50 as practiced in the embodiment. As shown in FIG. 3, the recording/reproducing apparatus for the DVD-R 50 includes the DVD-R 50, a pickup 51, a pre-pit detecting device 52, a strategy generating circuit 53, an 8/16 modulator 54 and a data encoder 55.

As shown in FIG. 3, the pre-pit detecting device 52 is composed of: a sample hold circuit 1; a sample pulse generating circuit 2; a delay adjusting part 3; adders 4, 5; a push-pull circuit 6; and a signal binarizing circuit 7. In operation, a first read signal Srfa, a second read signal Srfb, a third read signal Srfc and a fourth read signal Srfd are input from the pickup 51 to the pre-pit detecting device 52. The four read signals are generated as follows. First, a light beam is irradiated from the pickup 51. Then reflected light from the information recording surface of the DVD-R 50 driven to rotate is received in four regions A, B, C and D in a known quadripartite photo-detector, divided by a division line optically parallel with the tangential direction of the pre-grooves 102 and a division line perpendicular to the tangential direction. As a result, the four read signals are generated on the basis of the outputs of electrical signals from the divided regions according to the amounts of reflected light, respectively. It is assumed here that toward the front, the divided regions A and B are on the right side and the left side, respectively, and toward the back, the divided regions C and D are on the left side and the right side, respectively, in the traveling direction of the irradiation of the light beam to the pre-grooves 102. In other words, the divided regions A and D are on the LPP side of the pre-grooves 102. Further, a first light beam having recording power as first power and a second light beam having reproducing power as second power are irradiated onto the information recording surface on a time-shared basis according to the record information. Then the four read signals are input to the sample hold circuit 1 through each gain switching part, respectively. In the embodiment, it is assumed that an LPP signal component is contained in the first read signal Srfa and the fourth read signal Srfd from the pickup 51.

Figure 4:
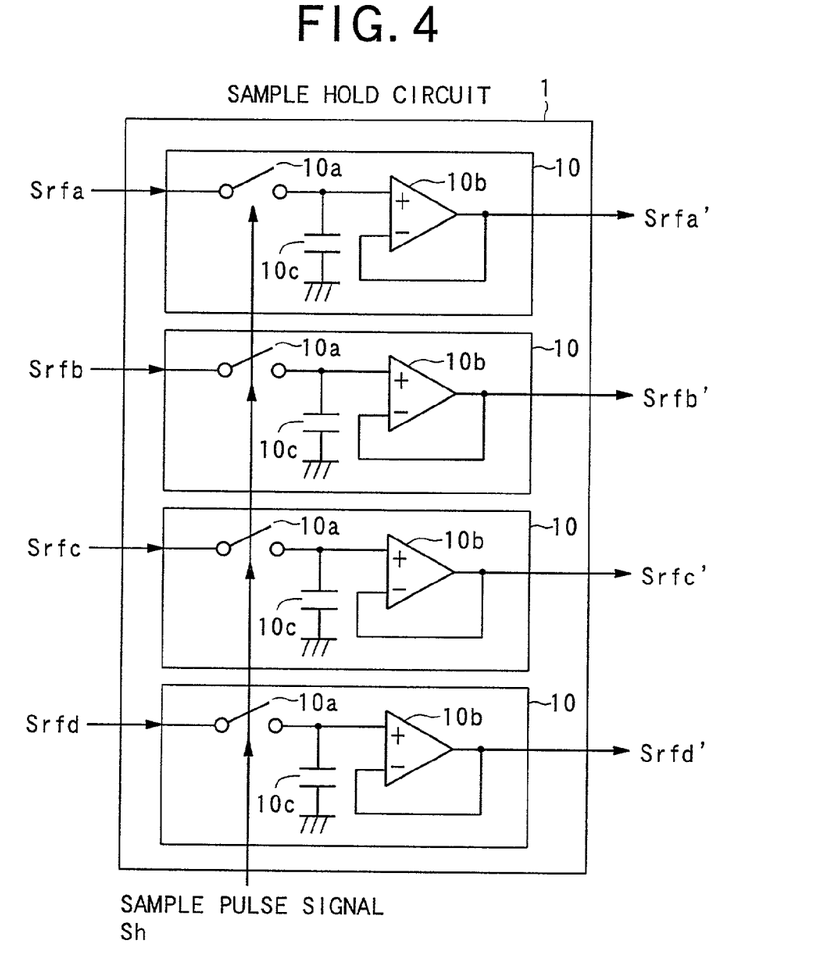
FIG. 4 is a diagram showing an internal configuration of a sample hold circuit 1.

FIG. 4 is a diagram showing an internal configuration of the sample hold circuit 1. As shown in FIG. 4, the sample hold circuit 1 includes sample hold parts 10 corresponding to the above-mentioned four read signals, respectively. Each sample hold part 10 is equipped with a switch 10a, an operational amplifier 10b and a hold capacitor 10c. In operation, the switch 10a is held closed while a sample pulse signal Sh supplied from the sample pulse generating circuit 2 is on an H level (during a sampling period). During this period, the above-mentioned four signals are output through each operational amplifier 10b.

Each hold capacitor 10c is charged to a voltage equal to the voltage of each of the above-mentioned four signals (that is, the voltage of the read signals based on the reproducing power) while the sample pulse signal Sh is on the H level (during the sampling period). On the other hand, electric charges are not discharged in any direction while the sample pulse signal Sh is on an L level (during a hold period), so that the hold capacitor 10c maintains the voltage. In other words, the above-mentioned four signals charged are output at the charged voltage level during the L level period (hold period).

The sample pulse signal Sh becomes the H level only during the space period, that is, while the light beam is irradiated to the DVD-R with the reproducing power during recording of the record information on the DVD-R 50. On the other hand, it is always on the H level during reproduction of the record information from the DVD-R 50.

The sample pulse generating circuit 2 shown in FIG. 3 generates the sample pulse Sh on the basis of a NRZI (Non Return to Zero Invert) signal Sec supplied from the 8/16 modulator 54 through the delay adjusting part 3. The time-base delay and pulse width of the sample pulse signal Sh can be set variable by means of the delay adjusting part 3. The NRZI signal Sec is generated from record information input from the outside, encoded at the data encoder 55, and 8/16 modulated at the 8/16 modulator on the basis of the clock signal.

The NRZI signal Sec is also supplied to the strategy generating circuit 53 in which the NRZI signal Sec is waveform-converted for adjusting the shape of a recording pit to be formed on the DVD-R 50 on the basis of the clock signal, and output to the pickup 51 as a strategy signal Srr. After that, the pickup 51 irradiates a light beam, whose intensity is modulated by the strategy signal Srr, onto a pre-groove 102 on which a pit corresponding to the record data is to be formed, thus performing recording of the record data.

Figure 5:
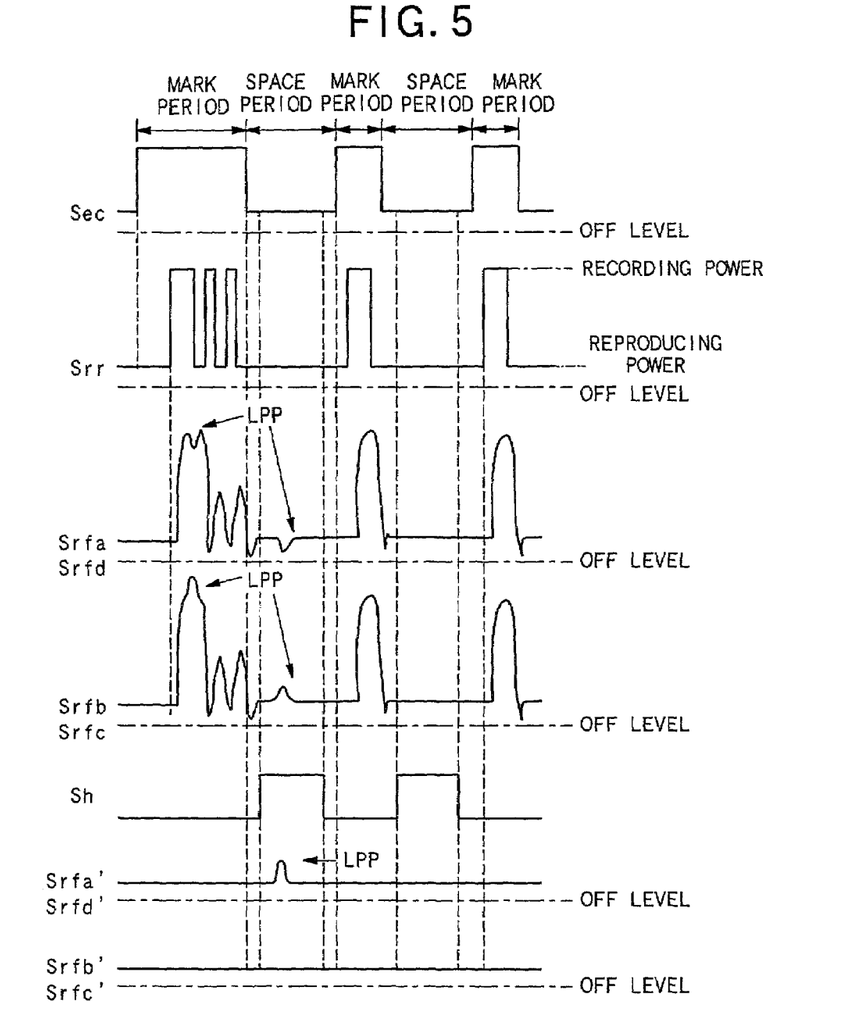
FIG. 5 is a timing chart of various signals in input/output portions of the sample hold circuit 1 during recording record information on the DVD-R 50.

FIG. 5 is a timing chart of various signals in input/output portions of the sample hold circuit 1 during recording of the record information on the DVD-R 50. It should be noted that waveforms of the first and fourth read signals Srfa and Srfd are substantially equal to each other (presence of the LPP signal component). Therefore, they are shown in a common waveform in FIG. 5 (Srfa' and Srfd' are shown in the same manner). Similarly, waveforms of the second and third read signals Srfb and Srfc are substantially equal to each other (absence of the LPP signal component), and shown in a common waveform in FIG. 5 (Srfb' and Srfc' are shown in the same manner).

As shown in FIG. 5, the sample pulse signal Sh is in the H level period (sampling period) during the space period of the NRZI (Non Return to Zero Invert) signal Sec. As a result, the above-mentioned four read signals (Srfa, Srfb, Srfc and Srfd) pass through the sample hold circuit 1 during the H level period (sampling period), and are output as a first read signal Srfa', a second re-ad signal Srfb', a third read signal Srfc' and a fourth read signal Srfd', respectively. The H level can be set within the space period. However, since an overshoot may be introduced into each read signal (Srfa, Srfb, Srfc or Srfd) during the interval from the mark period to the beginning of the space period, it is preferable that H level start time is set a little bit later than the space period start time so that the overshoot will fall within acceptable limits. This makes it possible to prevent the possibility of an error in detecting the LPP due to the overshoot, and hence detect the LPP more accurately.

On the other hand, the above-mentioned four read signals (Srfa, Srfb, Srfc and Srfd) cannot pass through the sample hold circuit 1 during the L level period (hold period). Instead, the four read signals (Srfa, Srfb, Srfc and Srfd) charged into each hold capacitor 10c are output during the mark period (sampling period) at the charged voltage level.

As a result, noise such as an electrical overshoot contained in the above-mentioned four read signals (Srfa, Srfb, Srfc and Srfd) input by irradiating the recording power during recording of the record information on the DVD-R 50 can be eliminated, which makes it possible to effectively extract (detect) the LPP signal component existing during the space period. The amplitude of the LPP signal component thus extracted is kept substantially constant throughout the period, which eliminates the need for two-stage setting of slice levels for generating the LPP signal at the signal binarizing circuit 7 to be described later.

Of all the four read signals (Srfa', Srfb', Srfc' and Srfd') output from the sample hold circuit 1, the first and fourth read signals Srfa' and Srfd' are added at the adder 4, and output to the push-pull circuit 6 as a first addition signal Srfad. On the other hand, the second and third read signals Srfb' and Srfc' are added at the adder 5, and output to the push-pull circuit 6 as a second addition signal Srfbc.

Figure 6:
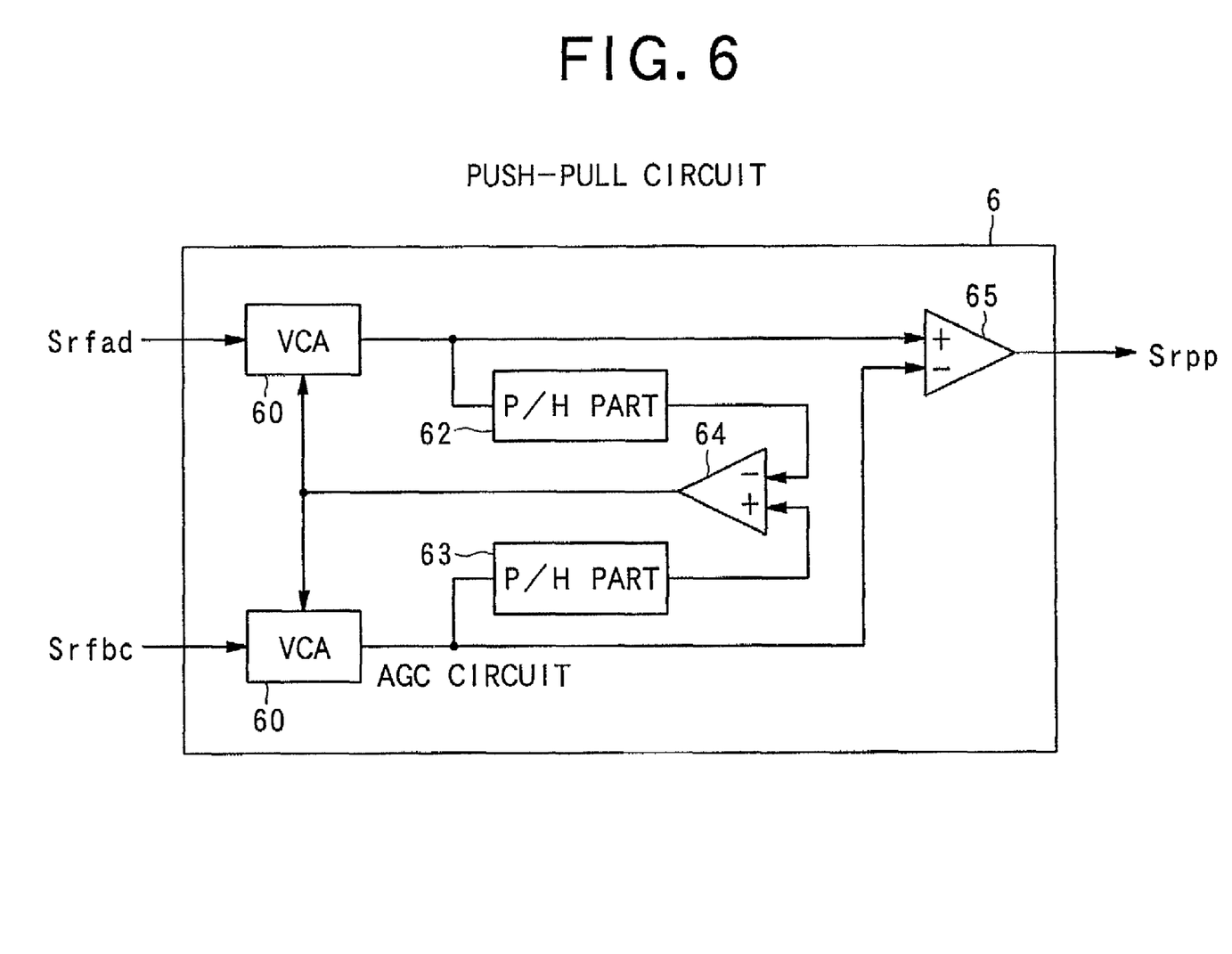
FIG. 6 is a diagram showing an internal configuration of a push-pull circuit 6.

FIG. 6 is a diagram showing an internal configuration of the push-pull circuit 6. As shown in FIG. 6, the push-pull circuit 1 is composed of voltage control circuits (VCA) 60 and 61, peak hold (P/H) parts 62 and 63, and subtracters 64 and 65.

Of all the elements, the voltage control amplifiers (VCA) 60 and 61, the peak hold (P/H) parts 62 and 63, and the subtracter 64 constitute an AGC circuit. The AGC circuit functions as amplitude correcting means which computes the difference between the amplitude of the first addition signal Srfad and the amplitude of the second addition signal Srfbc to bring both amplitudes close to each other on the basis of the difference therebetween, and consequently make them coincide.

To be more specific, the subtracter 64 computes the difference between the maximum amplitude of the first addition signal Srfad held by the peak hold (P/H) part 62 and the maximum amplitude of the second addition signal Srfbc held by the peak hold (P/H) part 63 to output a signal indicative of the difference to the voltage control amplifiers (VCA) 60 and 61, respectively. The difference signal is input into input terminals, mutually opposite in polarity, of the voltage control amplifier (VCA) 60 and the voltage control amplifier (VCA) 61.

Then the voltage control amplifier (VCA) 60 makes such a correction that the amplitude of the first addition signal Srfad is amplified at an amplification factor based on the difference signal to bring it close to the amplitude of the second addition signal Srfbc. On the other hand, the voltage control amplifier (VCA) 61 makes such a correction that the amplitude of the second addition signal Srfbc is amplified at an amplification factor based on the difference signal to bring it close to the amplitude of the first addition signal Srfad. In other words, since the difference signal is input into the input terminals, mutually opposite in polarity, of the voltage control amplifier (VCA) 60 and the voltage control amplifier (VCA) 61, the voltage control amplifier (VCA) 60 and the voltage control amplifier (VCA) 61 are reversely controlled. As a result, the amplitude of the first addition signal Srfad and the amplitude of the second addition signal Srfbc are brought close to each other, and consequently made to coincide.

Thus, since AGC can be performed for a wobble signal component after noise such as an electrical overshoot contained in the above-mentioned read signals are eliminated during the mark period, the amplitude of the first addition signal Srfad and the second addition signal Srfbc can be made to coincide accurately.

Then the subtracter 65 computes the difference between the corrected first and second addition signals Srfad and Srfbc to generate a radial push-pull signal Srpp to be output to the signal binarizing circuit 7. The radial push-pull signal Srpp is a composite signal generated by superimposing the LPP signal component on the wobble signal component.

The amplitude of the LPP signal component may fluctuate because of certain factors such as disk quality. Since the LPP signal component is compared with a predetermined slice level so that its existence will be sensed (binarized), fluctuations in amplitude of the LPP signal component may cause such an incorrect sensing result that the LPP signal component does not exist in spite of existing in fact. In this case, it is possible to perform gain adjustment so that the amplitude of the LPP signal component will be kept substantially constant. As one method of gain adjustment, it is possible to peak-hold the radial push-pull signal so that the peak values will be kept constant (for example, this method is carried out in the signal binarizing circuit). In other words, since the radial push-pull signal is generated by superimposing the LPP signal component on the wobble signal component, peak-holding the radial push-pull signal results in peak-holding the LPP signal component. Therefore, gain adjustment of the peak values makes it possible to get the amplitude of the LPP signal component fixed. However, this embodiment employs such a signal binarizing circuit (FIG. 7) as to reduce the occurrence of malfunctions due to nose components compared to the above-mentioned method.

Figure 7:
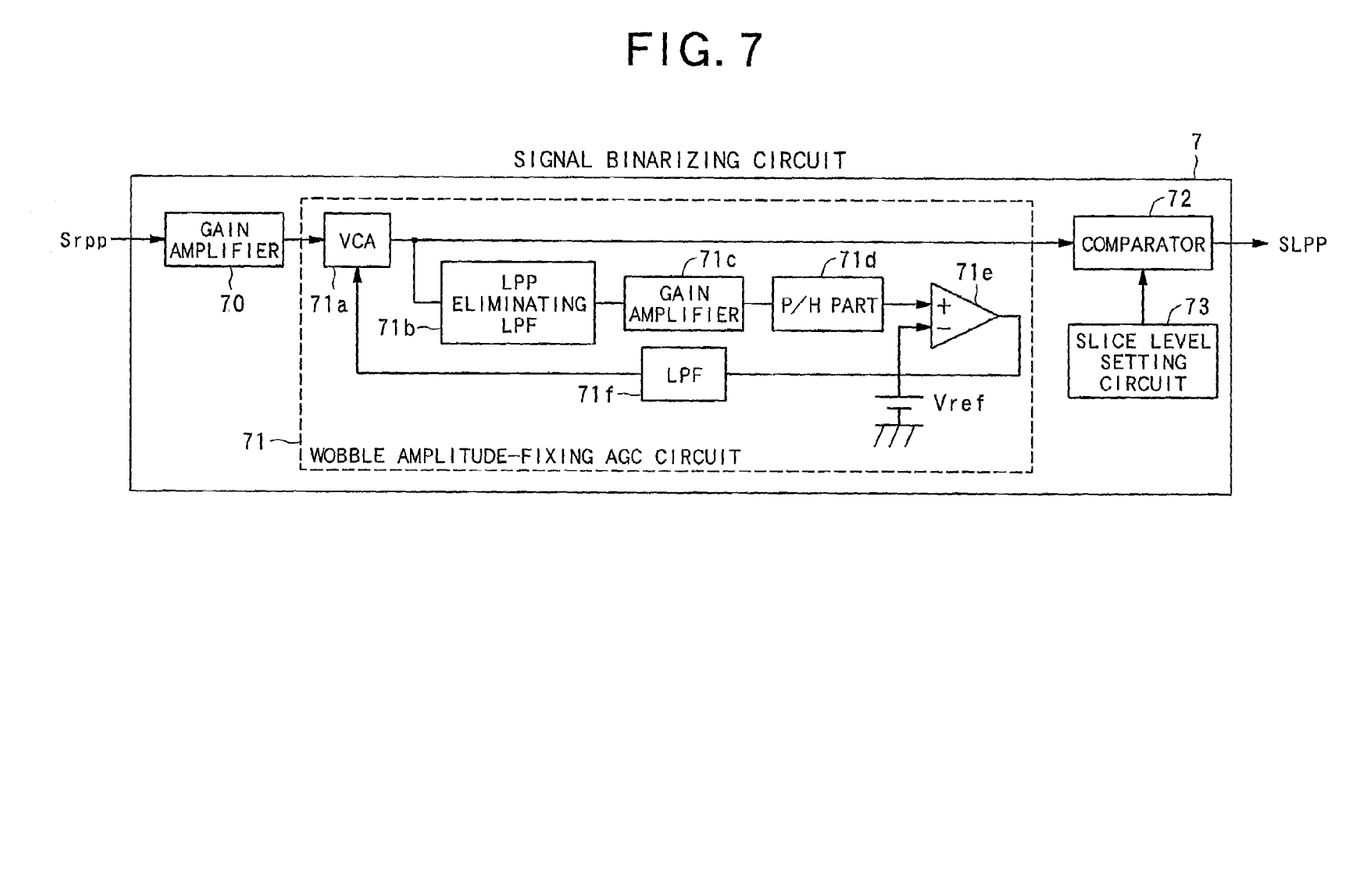
FIG. 7 is a diagram showing an internal configuration of a signal binarizing circuit 7.

FIG. 7 is a diagram showing an internal configuration of the signal binarizing circuit 7. As shown in FIG. 7, the signal binarizing circuit 7 is composed of a gain amplifier 70, a wobble amplitude-fixing AGC circuit 71, a comparator 72 and a slice level setting circuit 73.

In the signal binarizing circuit 7, the radial push-pull signal Srpp is input to the wobble amplitude-fixing AGC circuit 71 through the gain amplifier 70. The wobble amplitude-fixing AGC circuit 71 is equipped with a VCA 71a, an LPP eliminating LPF 71b, a gain amplifier 71c, a peak hold 71d, a subtracter 71e and an' LPF 71f.

The LPP eliminating LPF 71b eliminates the LPP signal component contained in the input of the radial push-pull signal Srpp to extract a wobble signal component. The gain amplifier 71c amplifies the extracted wobble signal component, and the peak hold part 71d holds the maximum amplitude of the wobble signal component. Then the subtracter 71e computes the difference between the maximum amplitude of the wobble signal component and a reference voltage (Vref) to supply the same to the VCA 71a through the LPF 71f. The LPF 71f is to control the response speed of the AGC circuit 71. The VCA 71*a* amplifies the radial push-pull signal Srpp at an amplification factor based on the supplied difference so that the radial push-pull signal Srpp will be made coincident with the reference voltage (Vref). Thus the amplitude of the radial push-pull signal Srpp can be kept constant. In other words, since the amplitude of the wobble signal component of the DVD-R 50 and the amplitude of the LPP signal component are both designed to fall within respectively predetermined limits, keeping the amplitude of the wobble signal component substantially constant allows the amplitude of the LPP signal component to be kept substantially constant. Since this relationship is realized in any other recording media, the signal binarizing circuit 7 is applicable to any other recording media. Further, the above-mentioned signal binarizing circuit that carries out the peak hold of the radial push-pull signal performs gain adjustment on the basis of the LPP signal component. In this case, since the appearance cycle of the LPP is long, and the number of appearances is small and changeable, if disturbance such as noise occurs, it will take time to return to a proper adjustment state. In contrast, since the signal binarizing circuit 7 performs gain adjustment on the basis of the wobble signal component that appears in a fixed cycle shorter than the LPP signal component, a return to a proper adjustment state can be realized quickly even if disturbance occurs.

Then the comparator 72 compares the radial push-pull signal Srpp, the amplitude of which has gotten fixed, with a slice level supplied from the slice level setting circuit 73 to generate an LPP signal Slpp to be output to an LPP-signal PLL (Phase Locked Loop) part, not shown, for generating a recording clock. For example, the LPP-signal PLL (Phase Locked Loop) part generates a recording clock on the basis of the LPP signal during recording of the record information on the DVD-R 50 to perform control necessary to record information.

As discussed above and according to the embodiment, the read signals input from the pickup 51 during the space period are output from the sample hold circuit 1. On the other hand, the read signals charged into the sample hold circuit 1 during space period are output at the charged voltage level instead of outputting from the sample hold circuit 1 the read signals input from the pickup 51 during the mark period. Therefore, the amplitude of the LPP signal component extracted can be kept substantially constant throughout the period, which makes it possible to get the slice level for generating the LPP signal fixed. Further, AGC can be performed after noise such as an electrical overshoot contained in the read signals input by irradiating the recording power is eliminated, which makes it possible to accurately detect only the LPP signal component that exists during the space period.

Further, there is no difference between the amplitude level of the LPP signal component during recording of the record information on the DVD-R 50 and the amplitude level of the LPP signal component during reproduction of the record information from the DVD-R 50, so that the above-mentioned slice level can be commonly used during recording and reproduction.

In the above-embodiment, the DVD-R was taken by way of example to describe the present invention, but the present invention is not limited thereto, and it is applicable to any other recording media such as a DVD-RW.

As described above and according to the present invention, even if noise such as an electrical overshoot is contained in the read signals input by irradiating the first power as recording power, since any pre-pit contained in the read signals is off the subject for detection, a correct recording clock pre-pits from which the noise is removed can be detected from only the read signals input during the irradiation of the second light beam.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. 2001-6567 filed on Jan. 15, 2001 including the specification, claims, drawings and summary is incorporated herein by reference in its entirety.

What is claimed is:

1. A pre-pit detecting apparatus in which recording control information, for use of recording control upon recording record information on a recording medium, is recorded in advance by forming pre-pits, the apparatus comprising: a light beam applying device for applying a first light beam having first power and a second light beam having second power different from the first power to the pre-pits on a times-shared basis according to the record information when recording the recording information on the recording medium; a read signal generating device for generating read signals from electrical signals according to the amounts of reflected light of the respective beams; and a pre-pit signal detecting device for inputting the generated read signal and detecting a pre-pit signal from the input read signal, wherein said pre-pit signal detecting device detects a pre-pit signal from only the read signals input during the period of applying of the second light beam.

2. The pre-pit detecting apparatus according to claim 1, wherein the first power is higher than the second power.

3. The pre-pit detecting apparatus according to claim 2, wherein the first power is higher than the second power.

4. A pre-pit detecting apparatus in which recording control information, for use of recording control upon recording record information on a recording medium, is recorded in advance by forming pre-pits, the apparatus comprising: a light beam applying device for applying a first light beam having first power and a second light beam having second power different from the first power to the pre-pits on a time-shared basis according to the record information when recording the recording information on the recording medium; a read signal generating device for generating read signals from electrical signals according to the amounts of reflected light of the respective beams; and a sample hold circuit for inputting the generated read signal and holding the input read signal at a predetermined timing, wherein said sample hold circuit outputs the read signals input during the period of applying of the second light beam while holding the read signals, and outputs the read signals, which is held during the applying of the second light beam, during the period of applying of the first light beam.

\* \* \* \* \*